(12) United States Patent
Gagliano et al.

(10) Patent No.: US 10,718,847 B2
(45) Date of Patent: Jul. 21, 2020

(54) FLEXIBLE BEACON SYSTEM

(71) Applicant: Lasermax, Inc., Rochester, NY (US)

(72) Inventors: Christopher A. Gagliano, Rochester, NY (US); Jeffrey D. Tuller, Rochester, NY (US); Jeffrey W. Mock, Rochester, NY (US); Brian L. Olmsted, Spencerport, NY (US)

(73) Assignee: LMD Power of Light Corporation, Rochester, NY (US)

( * ) Notice: Subject to any disclaimer, the term of this patent is extended or adjusted under 35 U.S.C. 154(b) by 220 days.

(21) Appl. No.: 15/869,864

(22) Filed: Jan. 12, 2018

(65) Prior Publication Data

US 2018/0259610 A1    Sep. 13, 2018

Related U.S. Application Data

(60) Provisional application No. 62/447,157, filed on Jan. 17, 2017.

(51) Int. Cl.
| | |
|---|---|
| *G01S 1/70* | (2006.01) |
| *F21S 9/02* | (2006.01) |
| *F21V 23/00* | (2015.01) |
| *F21W 111/00* | (2006.01) |
| *G06K 9/20* | (2006.01) |
| *G02B 6/26* | (2006.01) |

(52) U.S. Cl.
CPC ................... *G01S 1/70* (2013.01); *F21S 9/02* (2013.01); *F21V 23/008* (2013.01); *F21W 2111/00* (2013.01); *G02B 6/26* (2013.01); *G06K 9/20* (2013.01)

(58) Field of Classification Search
CPC .. G01S 1/70; F21S 9/02; F21V 23/008; F21V 14/00; F21W 2111/00; G06K 9/20; G02B 26/08; G02B 6/26
USPC ........................................................ 398/201
See application file for complete search history.

(56) References Cited

U.S. PATENT DOCUMENTS

| | | | | |
|---|---|---|---|---|
| 5,999,550 | A * | 12/1999 | Bellemore | H01S 5/042 |
| | | | | 372/38.02 |
| 9,746,369 | B2 * | 8/2017 | Shpunt | G01S 7/4817 |
| 9,917,652 | B1 * | 3/2018 | Bortz | H04B 10/691 |
| 2008/0262484 | A1 * | 10/2008 | Hawkins | A61B 18/203 |
| | | | | 606/12 |
| 2009/0302881 | A1 * | 12/2009 | Sedlacik | H01S 5/02212 |
| | | | | 324/750.03 |
| 2011/0062888 | A1 * | 3/2011 | Bondy | H05B 45/10 |
| | | | | 315/294 |
| 2011/0231035 | A1 * | 9/2011 | Houde-Walter | G01S 1/70 |
| | | | | 701/2 |
| 2012/0033416 | A1 * | 2/2012 | Ballard | F21L 4/027 |
| | | | | 362/202 |
| 2012/0256088 | A1 * | 10/2012 | Balonek | G02B 23/12 |
| | | | | 250/330 |
| 2016/0255285 | A1 * | 9/2016 | Balonek | G02B 23/12 |
| | | | | 250/338.4 |
| 2016/0270148 | A1 * | 9/2016 | Filipovic | H04W 88/08 |

* cited by examiner

*Primary Examiner* — Abbas H Alagheband
(74) *Attorney, Agent, or Firm* — Lee & Hayes, P.C.

(57) ABSTRACT

A beacon system includes a controller, a laser module operably connected to the controller, and at least one sensor operably connected to the controller. In such a system, the controller is configured to receive a signal from the at least one sensor, and to determine whether a response to the signal is required.

21 Claims, 4 Drawing Sheets

FLEXIBLE BEACON SYSTEM

CROSS-REFERENCE TO RELATED APPLICATION

This application is a nonprovisional of U.S. Provisional Application No. 62/447,157, filed Jan. 17, 2017, the entire disclosure of which is incorporated herein by reference.

FIELD OF THE INVENTION

The present invention relates to beacon systems, and more particularly to beacon systems usable to create wide area emissions such as may be suitable for a laser beacon system.

DESCRIPTION OF RELATED ART

Rescue and identification beacons that do not emit radio frequency signals are of particular interest in applications where radio frequency communications may be difficult to establish and maintain, where electronic interference or absorption prevents reliable communication, or where detection and interception of such signals may be problematic.

One way to meet these requirements is to use portions of the electromagnetic spectrum that include infrared light. However, there are a number of challenges associated with providing beacons of this type. Meeting size and weight constraints is critical to the success of such beacon systems as these constraints impact the extent to which such devices are practically portable or hand-held. Additionally, such systems must be survivable in portable applications and must be capable of extended operation. Such requirements can significantly be perceived as having contradictory implications, with a desire for small size and light weight operation being contrary to the requirement of ruggedness which requires extra weight and size and the requirement of extended operation requiring significant power supplies which can add weight and volume again increasing challenges associated with providing for the desired ruggedness.

Further, systems that are highly complex or that require precise placement of and alignment of optical and electronic components tend to be more vulnerable to damage through incidental contact, thermal extremes, or other damage that may occur during operation. This again raises the requirements for the ruggedness of the system.

Additionally, systems are desired that enable detection of signals from the beacon across a wide range of positions relative to the beacon and that do not require moving parts to accomplish this result.

What is needed therefore is a small, portable, light weight, beacon system that can generate appropriate signals without requiring precise placement of optical components.

Further, such a beacon system should be designed to avoid unnecessary emission of non-radio frequencies in ways that might allow detection or interception of the emissions while allowing movement of the person.

Finally, the beacon system must be easily used with any interactions with the system designed to enable, rapid confident use by field operatives who may be distracted, injured, under fire and who may be wearing gloves or other protective equipment.

DETAILED DESCRIPTION OF THE DRAWINGS

Figure 1:
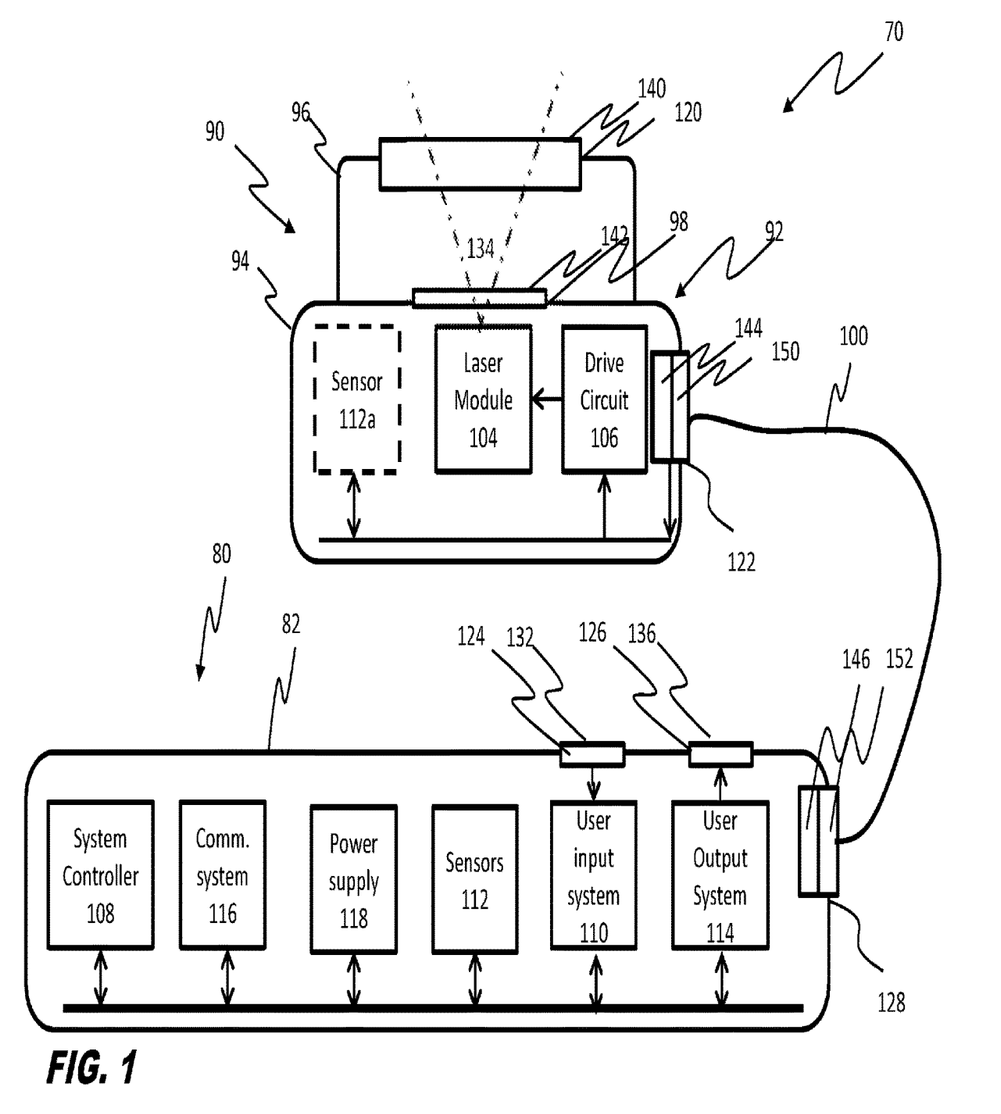
FIG. 1 is a schematic view of first embodiment of a beacon system having an emitter module, a power and control module, and an interconnect.
Figure 2:
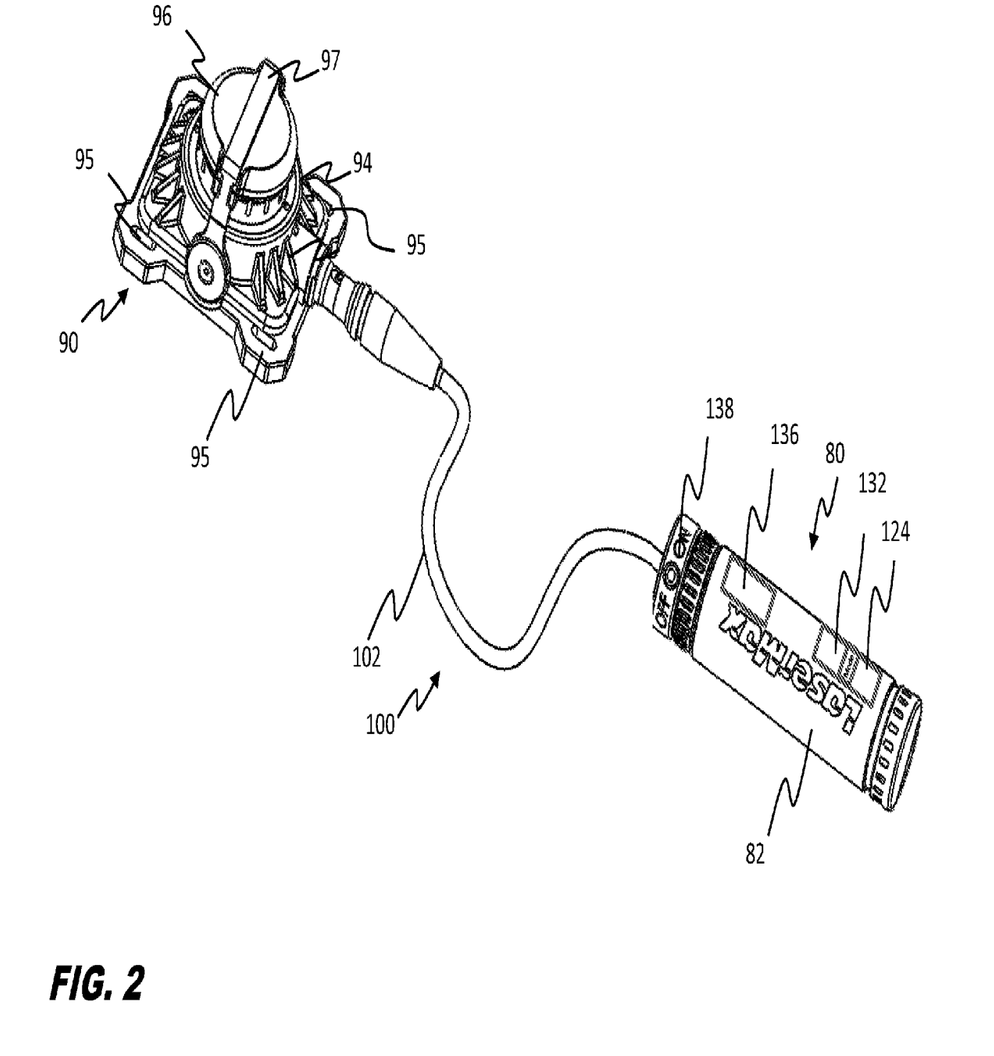
FIG. 2 is a top, front, right side, isometric view of the beacon system of the embodiment of FIG. 1.

Unless stated otherwise herein, the drawings are not necessarily to scale. FIG. 1 is a schematic view of an embodiment of a beacon system 70. FIG. 2 is a top, front, left side, isometric view of the embodiment of FIG. 1. In the embodiment illustrated in FIGS. 1 and 2 beacon system 70 has a laser module 104, a drive circuit 106, a system controller 108, a user input system 110, sensors 112, a user output system 114, a communication system 116, and a power supply 118. In operation, system controller 108 receives signals from user input system 110, sensors 112, and communication system 116 and determines whether a response to such signals is required. When system controller 108 determines to respond to received signals by causing a laser emission, system controller 108 sends signals to drive circuit 106 causing drive circuit 106 to supply electrical energy from power supply 118 to laser module 104 in a manner that causes laser module 104 to emit a beam of light 134. System controller 108 can also generate signals that cause user output system 114 to generate a human perceptible output. Additionally, system controller 108 can send signals to communication system 116 causing communication system 116 to send signals to other devices, to cause communication system 116 to receive signals from other devices or both. Power supply 118 provides electrical energy to drive circuit 106, system controller 108, user input system 110, sensors 112, user output system 114, and communication system 116.

Beacon system 70 may be used in a wide variety of applications including applications where beacon system 70 may be carried or worn as portable equipment by a user, mounted to any known mounted or dismounted crew-served weapon, including but not limited to machine guns, artillery, recoilless rifles and other types of crew served weapons, rescue and first responder equipment, drones, and all manner of aircraft, land vehicles, and seaborne equipment. In such applications beacon system 70 may be positioned where beacon system 70 may be exposed to damage such as through incidental or accidental contact, mishandling, exposure to contaminants, liquids and humidity, shock and vibration damage as well as temperature extremes. However, using the simple expedient providing a robust protective enclosure about a unitary style beacon is not a sufficient solution as this solution adds mass and volume to the unitary beacon that increases the risk of incidental damage, mishandling and the burden on the user of the device in portable applications or the burden on equipment such as aircraft such that other solutions are necessary.

Additionally, in many cases it may be desirable to position beacon system 70 where beacon system 70 can emit for example non-visible light that can be detected from a distance. However, beacon system 70 may have many controls and adjustments that a user may wish to adjust from time to time. This creates design challenges in some applications in that it is not desirable for a user to position himself or herself in a position where he or she can be potentially observed in order to make such adjustments.

Further, ensuring that beacon system 70 is operable and is in fact operating as desired requires that beacon system 70 provides some types of feedback to a user. Generating audible or visible feedback from a beacon system 70 that is positioned for detection in non-visible bands can create noise or visible light that may not be acceptable in some applications.

What is needed therefore is a beacon system 70 that reduces the burden of transporting and using beacon system 70, allows human detectable feedback and useful control opportunities all without limiting the functionality of beacon system 70.

In the present embodiment one or more of these problems is addressed by providing a beacon system 70 having a distributed architecture with components of beacon system 70 separately arranged into a control unit 80 and an emitter unit 90 Control unit 80 has a control unit housing 82 that is separate from an emitter unit housing 92 of emitter unit 90. Components of beacon system 70 are selectively positioned in association with one of control unit housing 82 or emitter unit housing 92 to reduce any of the size and weight of emitter unit 90 and to allow active control of and feed back from beacon system 70 without requiring access to or movement of emitter unit 90.

In general, either of control unit housing 82 or emitter unit housing 92 can be formed using any of a variety of rigid materials such as composites, laminates, plastics or metals. In one configuration, either or both of power and control unit housing 82 and emitter unit housing 92 can be formed of an extruded aluminum, thereby providing sufficient strength without requiring significant weight while also providing good thermal transfer properties. Control unit housing 82 and emitter unit housing 92 can be fabricated or assembled in any of a variety of ways. In one embodiment, either of control unit housing 82 and emitter unit housing 92 can be machined such as by EDM (electrical discharge machining), assembled, cast, forged, or molded where, for example, composites, laminates, plastics or metals are employed. Either or both of control unit housing 82 and emitter unit housing 92 also can be fabricated using other conventional techniques including but not limited to additive assembly techniques.

In the embodiment illustrated in FIGS. 1-2, emitter unit 90 is shown having a base module 94 and a distribution module 96. Base module 94 may be joined to distribution module 96 in a manner that is intended to be a generally permanent combination of the type, for example, that is disassembled only during repair or heavy maintenance operations. Alternatively, base module 94 may be joined, mounted, fixed, or otherwise mechanically linked to distribution module 96 in a fashion that allows separation of base module 94 from distribution module 96 such that base module 94 can be used without distribution module 96 or so that more than one type of distribution module 96 can be used with base module 94.

In FIGS. 1-2 base module 94 is configured to provide surfaces that enable base module 94 to be joined, fixed, held, mounted or otherwise positioned for movement by personnel, such as being carried manually or in holsters, helmets, or other bodily worn equipment. For example, in FIG. 2 mounting points 95 are shown on base module 94 that allow base module 94 to be joined by way of fasteners (not show) to other devices including without limitation weapon systems such as a hand-held weapon system or to any of a variety of direct fire weapons such as handheld, side, and small firearms. Such firearms include, but are not limited to, pistols, rifles, shotguns, automatic arms, semi-automatic arms, rocket launchers and select grenade launchers and bows, protective equipment such as helmets, packs, clothing, equipment and the like, aircraft, human powered vehicles and the like. Base module 94 can be shaped or otherwise fitted into shapes appropriate for mounting or joining to other devices and can be incorporated into weapons, protective equipment, clothing, other equipment and devices. As is also shown in FIG. 2, a protective cap 97 may be provided to protect optical element 140 when beacon system 170 is not in use.

In the embodiment of FIGS. 1-2, beacon system 70 has system controller 108, user input system 110, sensors 112, user output system 114, communication system 116, and power supply 118 encompassed, substantially enclosed, or otherwise retained or provided within control module housing 82, while a laser module 104 and a drive circuit 106 are encompassed, substantially enclosed, or otherwise retained or provided within emitter unit housing 92. Emitter unit housing 92 has a port 144 and control unit 80 has a port 146 each adapted to link to one end of an interconnect 100. In embodiments interconnect 100 can be hardwired or otherwise substantially permanently linked between control unit 80 and emitter unit 90.

Interconnect 100 provides a one or more pathways 102 for electrical energy and control signals to pass between control unit 80 and emitter unit 90. As is shown here interconnect 100 may be flexible to allow a user freedom in arranging control unit 80 and emitter unit 90. Interconnect 100 may include one or more electrically conductive wire such as a copper wire or other forms of electrical conductors, and may include optical fibers or any other pathways for any other optical or other signals or energy to pass between control unit 80 and emitter unit 90. Interconnect 100 may have mechanical or magnetic or other mounting features 144 and 146 adapted to cooperate with mechanical features or magnetic or features 150 and 152 of ports 122 and 128 to help hold interconnect 100 in a mounted arrangement wherein electrical, optical or other connectors (not shown) control unit 80 and emitter unit 90 make electrical, optical or other connections (not shown) in interconnect 100 to establish power and communications channels. In embodiments mounting features 144, 146, 150 and 152 are designed to enable separation where forces greater than a predetermined force or of an unexpected type are applied to the connectors. This can have the effect of lowering risks associated with snags.

It will be appreciated that by separating certain components from the emitter unit 90, an emitter unit housing 92 can be made smaller than a single beacon unit that contains both emitter related components and other components of system 70. Additionally, this allows there to be more degrees of freedom to provide features to minimize the risk that incidental contact will be damaging such as deflection surfaces.

It will also be appreciated that this arrangement allows the mass of emitter unit 90 to be positioned, carried or worn more easily and to be held in position with mountings that weigh less and that are less intrusive than those required to mount heavier unitary beacon units. This arrangement further lessens the requirements and weight associated with mounting structures such as mounting lugs, straps, fasteners, magnets, adhesives and the like used to join emitter unit 90 to other objects and lessens the requirements imposed on structures such as base module 94 to sustain being mounted to such objects. Further, this arrangement may reduce the weight of protective structures such as emitter unit housing 92 that are required to protect equipment in emitter unit 90 from vibration, shock and inertial events such as drops either because there is less to protect or because there is less mass and therefore less gravity induced acceleration on the components prior to impact in the event of a drop or fall.

Drive circuit 106 receives power from power supply 118 and control inputs from system controller 108. In response to the control inputs received from system controller 108, drive circuit 106 generates signals that cause laser module 104 to emit laser light. In the embodiment that is illustrated in FIGS. 1-2 laser module 104 receives power by way of drive circuit 106 such that drive circuit 106 can control the time, duration, and intensity of electrical energy supplied to laser module 104. Drive circuit 106 may be configured to assist in tuning and/or otherwise controlling the output of laser module 104. Drive circuit 106 can be constructed to provide either pulsed or continuous operation of laser module 104. The rise/fall time of the pulse, compliance voltage and current generated by drive circuit 106 for the laser module 104 are selected based at least in part upon power consumption, heat generation and desired beam characteristics. These parameters may also be selected to cause laser module 104 to produce a beam having a desirable wavelength, frequency, transverse mode number and/or other quantifiable characteristics.

Depending on the desired output, drive circuit 106 can enable operation of the laser module 104 as a continuous or pulsed laser, such as by passive, active, or controlled switching. Although specific values depend upon the particular laser module 104 and intended operating parameters, it is contemplated the peak power draw of drive circuit 106 may be between approximately 1 amp and approximately 10 amps, with an average current draw between approximately 0.1 amps and approximately 1.0 amps. As the required voltage may be between on average approximately 9 volts and approximately 12 volts, approximately 9 W to approximately 12 W may be consumed. This may represent a substantial power consumption as well as heat generation. It will be appreciated that these power levels, current levels and voltage levels are exemplary only and are not limiting.

In an exemplary embodiment, drive circuit 106 may assist in controlling and/or modifying the power level of laser module 104 to aid in penetrating components or conditions of the atmosphere through which beacon system 70 will direct laser emissions 134. Such components or conditions may include, for example, snow, rain, fog, smoke, mist, clouds, wind, dust, gas, sand, and/or other known atmospheric or airborne components. For example, drive circuit 106 can be configured to controllably, manually, and/or automatically increase the current and/or voltage directed to strengthen and/or intensify laser emissions 134 emitted by laser module 104 in such conditions. In embodiments an optional sensor 112a can be positioned in emission module to sense atmospheric conditions.

It is also understood that laser module 104 can have one or more than one laser and where there is more than one laser, the lasers may be of the same or of a different type and may be of a same type but emitting at different wavelengths. In one exemplary embodiment of this type, a laser module 104 can have a semiconductor laser in the form of a mid-range adapted infrared quantum cascade laser and another semiconductor laser in the form of a long-wave adapted infrared quantum cascade laser. Other combinations of semiconductor lasers are possible including but not limited to inter-band quantum cascade lasers, VCSELs or grating surface-emitting lasers. Such lasers can emit light for example and without limitation in visible, infrared including near infrared, mid-wave infrared and long-wave infrared, and ultraviolet wavelengths.

Alternatively, in other embodiments, laser module 104 can include components that can receive signals from drive circuit 106 and that can adjust power consumption in response to such signals. In such an alternative embodiment, laser module 104 may receive electrical energy directly from power supply 118.

Figure 3:
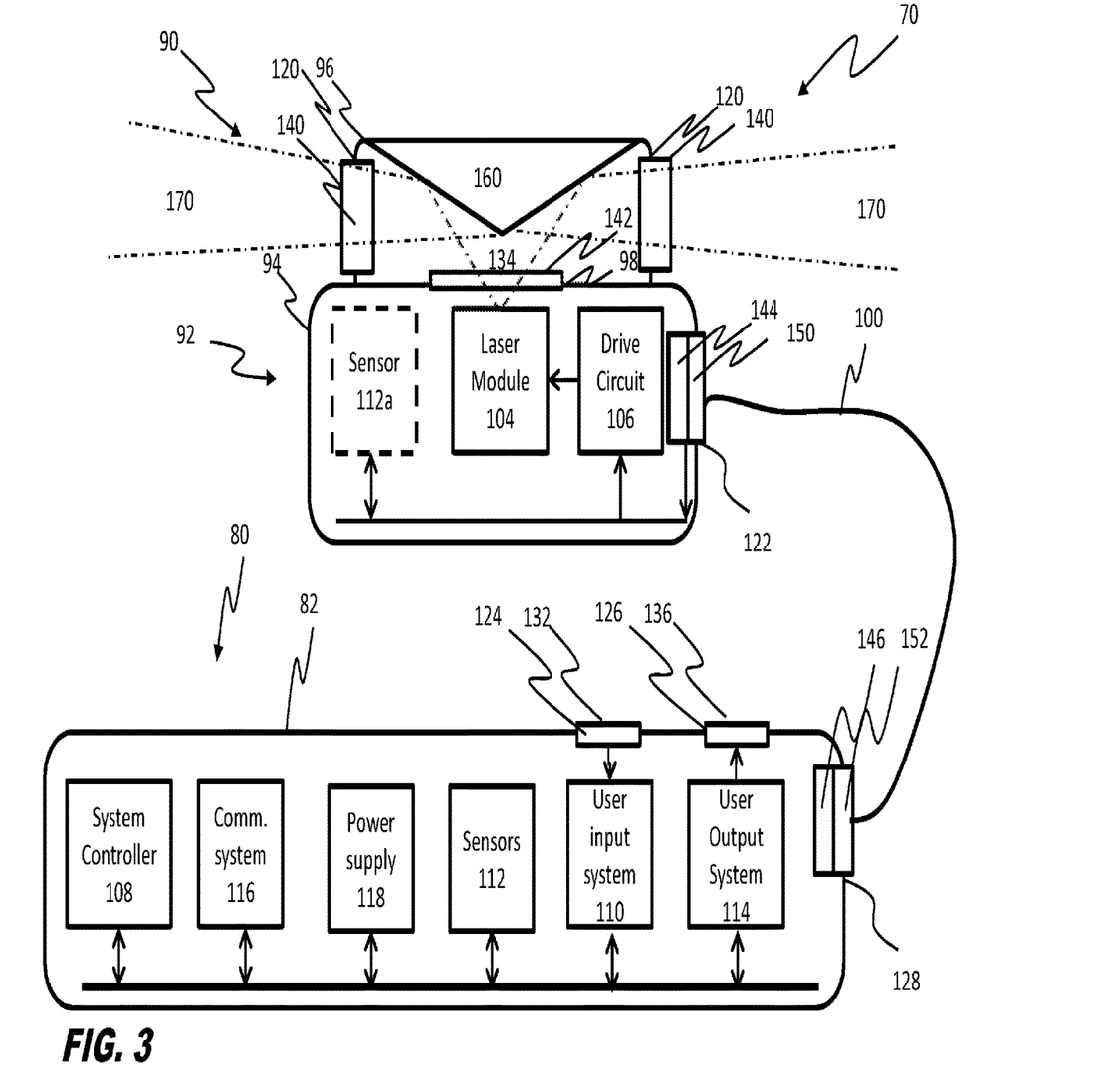
FIG. 3 is another embodiment of a beacon system.

In the embodiment illustrated in FIGS. 1-3 emitter unit housing 92 includes a distribution module 96 with at least one opening 120 to allow light 134 emitted by laser module 104 to exit from distribution module 96. Here, optical element 140 has a lens or window or other known optical element positioned in opening 120 to reduce the extent of or to prevent air flow, or the movement of moisture or contaminants into or out of distribution module 96. In the embodiment illustrated distribution module 96 is separably mounted or otherwise fixed in a non-permanent manner relative to base module 94 and base module 94 has laser module 104 positioned to direct light 134 emitted therefrom through an opening 98 having an optional optical element 142 such as a window or lens positioned in opening 98 to reduce the extent of or to prevent air flow, moisture or contaminants into or out of base module 92. In this embodiment, laser module 104 and optical element 142 may be defined so that light 134 is emitted in a first pattern when distribution module 96 is attached to base module 94 and is emitted in a different pattern when distribution module 96 is not attached to base module 94. For example, and without limitation laser module may emit beam of laser light 134 having a first cross sectional distribution pattern across a segment of beam 134 when only optical element 142 is present in the path of beam 134 while a segment of a beam of light 134 that passes through optical element 142 and through optical element 140 may have a different distribution based upon the initial pattern of light 134 emitted by laser module 104, any modifications the distribution of beam 134 caused by optical element 142 and any modifications to the distribution caused by optical element 140.

In embodiments, differences between the patterns of light 134 that come from emitter unit 90 can be applied to different purposes such as by concentrating available laser light 134 in directs where such light 134 will have the most impact, such as by concentrating such light in narrowly divergent directions for purposes such as acting as a directional beacon, concentrating such light within certain distribution patterns such as patterns that are limited to a range of directions relative to the horizon such as those that will be best sensed by ground or seaborne equipment, or patterns that concentrate available light to increase the probability of airborne detection.

Also shown in FIGS. 1 and 2 is an opening 124 that is occupied by a user input sensor 132 and opening 126 that is shown as being occupied by a user output video display 136. In certain embodiments, seals (not shown) can be supplied at one or more of openings 98, 120, 124, and 126 or at ports 122 and 128 to provide a barrier to resist entry of contaminants so as to protect the components disposed within control unit housing 82 or emitter module housing 92 from water, dust, vapors, or other harmful contaminants commonly experienced in non-controlled environment use. Optionally, either or both of control unit housing 82 and emitter module housing 92 can be hermetically sealed.

User input system 110 includes human operable sensors such as switches, touch pads, joysticks, audio, video, keypads, key locks, proximity sensors or any other known types of sensors that can detect a user input action and that can provide signals to system controller 108 indicative of the user input action. In the embodiment of FIGS. 1 and 2, user input system 110 can use user input sensor 132 to enable manual selection of different operating mode selections such as an on and an off selection, a high setting, a low setting and a training setting each being associated respectively with a different intensity levels. Additionally, user input system 110 can be adapted to receive inputs to determine different pulsing schemes for pulsing laser module 104 and to receive data or other information that may be encoded or used to determine encoded messages to be used in encoding signals. In embodiments, user input system 110 and system controller 108 may use signals from sensors 112 to detect user input actions or to automatically select modes of operation. Also shown in FIG. 2 is an optional master on/off switch 138.

Sensors 112 can include any form of device that can be used to detect or otherwise sense conditions inside or outside of system 70 that may be useful to system controller 108 in determining actions to be taken in operating beacon system 70. Sensors 112 can include without limitation, light sensors such as photovoltaic cells, contact switches, opto-electronic sensors such as light beam emitter and sensor pairs, electro-mechanical sensors such as limit switches, strain sensors, and proximity sensors such as Hall-effect sensors, thermal sensors, meteorological sensors, such as humidity sensors, accelerometers, orientation sensors and other known sensors and transducers. Optionally one or more sensor 112*a* can be positioned in emitter unit 90 for the purpose of sensing conditions such as the temperature, orientation, vibration, shock, other conditions optical, or electronic signals detectable at emitter unit 90 so as to provide feedback to system controller 108 by way of interconnect 100.

User output system 114 can include, any type of device that can generate a human perceptible signal including without limitation equipment that can generate a visually detectable signal such as video display 136 or other forms of light emitters are modulators or other sources of human perceptible visual signals as well any form of device that can generate audio signals or tactile signals from which a user can determine for example, and without limitation, a status of beacon system 70, an operating mode of beacon system 70, that beacon system 70 is emitting a laser emissions 134 and a characteristics of the laser emissions 134 that beacon system 70 is emitting or will emit when instructed to do so. In this regard, user output system 114 can include circuits with transducers that can convert energy supplied by power supply 118 into such visual, audio or tactile signals along one or more driving circuits to cause such transducers to generate the visual, audio or tactile signals.

Communication system 116 can include any combination of known communication circuits including wired or wireless transponders, transceivers, transmitters, receivers, antennas, modulators, de-modulators, encryption and de-encryption circuits or software and can provide other known components to facilitate data communication, the exchange of control signals or power exchanges in wired or wireless form.

Depending upon the anticipated power requirements, available space, and weight restrictions, the batteries can be N-type batteries or AA or AAA batteries. Additionally, a lithium/manganese dioxide battery such as military battery BA-5390/U, manufactured by Ultralife Batteries Inc. of Newark, N.Y. can be used with beacon system 70. A battery used in a battery-type power supply 118 can be recyclable, disposable or rechargeable. Battery compartment can be formed of a weather resistant, resilient material such as plastic, and shaped to include receptacles for receiving one or more batteries or other power storage devices. Further, the battery compartment may be selectively closeable or sealable to prevent environmental migration into the compartment or to create a hermetically sealed environment therein.

In other exemplary embodiments, power supply 118 can take the form of a fuel cell, capacitive system or other portable electrical energy storage or generation system. It is understood that any type of power supply 118, preferably portable and sufficiently small in size can be utilized.

It will also be appreciated that, in embodiments, power supply 118 can be at least in part external to control unit 80 with power being supplied from external sources through a transfer port (not shown) or through non-contact charging technologies such as inductive charging. Power received through power supply 118 or through such other sources can be used to directly operate beacon system 70 or to supply power that may supplement power created by batteries or other power sources positioned within housing 82 or to recharge such batteries or other power sources. Power supplied by such other sources can include vehicle power sources such as those found in motor vehicles, aircraft, watercraft, and other equipment.

As is noted above, system controller 108 drives operation of beacon system 70 and receives signals from user input system 110, sensors 112 and communication system 116 that system controller 108 can use to control operation of beacon system 70. System controller 108 comprise for example a computer, a microprocessor, micro-controller, programmable analog logic device or a combination of programmable or hardwired electronic devices capable of performing the functions and actions described or claimed herein.

In the embodiment of FIGS. 1 and 2 system controller 108 optionally determines a mode of operation of beacon system 70 in response to a signal from any of user input system 110, sensors 112 or communication system 116.

In one non-limiting example, an activation area 130 may be defined in which a user can make a user input action that can be sensed to determine whether to activate or deactivate beacon system 70. For example a user input sensor 132 may be positioned on control unit housing 82 to detect the user input action within activation area 130. In one example sensor 132 may take the form of a mechanical, electromechanical, optical, electro-optical, magnetic or Hall-effect or any other type of switch capable of detecting when a finger is pressed against the switch. In other embodiments, sensor 132 may not require contact. For example and without limitation sensor 132 may be of a type that senses proximity or touch through capacitive sensing circuits, ultrasonic sensing circuits, thermal sensing circuits or an optical sensor.

When system controller 108 receives signals from user input system 110 indicating that a user input action has been made, such as by putting a finger against or proximate to activation area 130, system controller 108 can determine an appropriate response, such as sending a signal to system controller 108.

Other modes of operation are possible and any or all of user input system 110, sensors 112 and communication system 116 can be used to receive or sense user input actions, conditions or signals that may be provided to system controller 108 and that system controller 108 may use to determine that a particular additional mode of operation is appropriate.

For example a "Stand By" mode of operation can be provided to conserve stored energy of from power supply 118 while maintaining the beacon system 70 in an advanced state of readiness for use. For example, communication system 116 may receive signals indicating that beacon system 70 is to enter the "Stand By" mode can send signals to system controller 108 from which system controller 108 can determine for example that this "Stand by" mode of operation has been selected remotely or that this standby mode should be selected based upon signals received.

In one example of this type of situation, system controller 108 can determine that a "Stand by" mode has been selected and can respond to this by sending signals to drive circuit 106 causing drive circuit 106 to begin supplying power circuits or subsystems, if any, that require some time to reach a state where they are ready for immediate activation. Not all circuits or subsystems will need be activated at such times and a "Stand By" option relieves the operator from being confronted with the choice of operating the beacon system 70 in a high power consumption "On" mode prior to the need to do so and the choice of holding the device in the "Off" state to conserve power with the understanding that there will be a lag time before activation.

In another example of such a mode, user input sensor 132 may be operable to receive a user input action from which system controller 108 can determine that a "test" mode is to be used. Such a "test" mode may be provided wherein for example, system controller 108 can cause laser module 104 to emit a laser emissions 134 at a lower power than used for other purposes. This lower powered laser emissions 134 can be used to allow verification of the operational status of beacon system 70 such as by emitting a lower powered laser test beam that can be directed at, for example, nearby targets for training purposes or at target strips or pages that change in appearance when illuminated by the laser in the test mode.

In embodiments, laser module 104 can comprise for example, any semiconductor device that can emit a laser output and can include but is not limited to diode lasers, quantum cascade lasers, and inter-band cascade lasers. These types of lasers share generally the characteristics of being made from a semiconductor material and having a emitting a divergent laser light beam while also generating a meaningful amount of heat that must be dissipated to protect laser module 104. In general, the amount of heat that is generated by laser module 104 is radiated into the environment surrounding laser module 104. By positioning laser module 104 in an emitter unit 90 it becomes possible to reduce position laser module in closer contact with the environment surrounding emitter unit 90 than is typically possible in a unitary beacon system in which all of the components of the beacon system are within a single structure. Additionally, in embodiments one or more thermal conductors may be provided in interconnect 100 and thermally connected to receive heat from laser module 104 or drive circuit 106 so that such heat is has an additional path leading away from away from emitter unit 90. This can be used to enhance the effective cooling capabilities of the overall beacon system 70. Heat traveling along this path may be radiated or stored in the thermal conductor. In embodiments, such a thermal conductor may have additional purposes such as acting as an electrical conductor between electrical systems in the control unit 80 and electrical systems in the emitter unit 90. In embodiments, special purpose thermal conductors may be provided in or with interconnect 100. Such special purpose thermal conductors may be adapted to utilize the surface area of interconnect 100 to radiate such heat.

In the embodiment illustrated in FIGS. 1 and 2, laser module 104 emits divergent laser emissions 134 having a wavelength in the infrared region such as between 2 μm and 30 μm wavelength. However, in other embodiments, semiconductor laser can emit laser emissions 134 having any of a wide range of wavelengths including but not limited to ultraviolet wavelengths, visible wavelengths, and near infrared wavelengths. For the purposes of the following discussion, it will be assumed that in the embodiment of FIGS. 1 and 2, semiconductor laser is a quantum cascade type laser.

Laser emissions 134 from beacon system 70 may be highly divergent and spread over a wide range of angles to assume for example and without limitation a cone shape. However, the intensity of the laser emissions 134 may vary across a cross sectional area of the cone. When operated to emit a single mode of laser emissions, laser emissions from semiconductor laser may take on a Gaussian intensity distribution. However, as is noted above optical elements 140 and 142 may be used to adjust this distribution. Additional optical elements may be used as an option.

In operation drive circuit 106 may be adapted to modulate laser emissions 134 to create a pattern of emissions over time or to help manage heat or both. This pattern may contain data such as an identification of beacon system 70, the operator of beacon system 70 or other data that may be encoded in such a signal. Drive circuit 106 may also modulate laser emissions 134 at frequencies between 2 and 10 Hz in order to make the appearance of the pattern more identifiable to human observers. Similarly, drive circuit 106 may also modulate the super-pulse pattern at other frequencies or patterns to make the pattern more identifiable to automatic equipment that may be used to locate either beacon system 70 or other objects or events that may be sensed using thermal or other types of sensing. Such modulation may be performed in a manner intended to prevent mis-identification of laser emissions 134 as other sources of detected light so as to prevent automatic activation of systems on search equipment such as imaging systems, imager protection systems and other systems that automatically act to protect search drones, aircraft or other systems monitoring the area. Further, such modulation may be user programmable either by way of user input system 110, or ports including but not limited to port 122 and port 128 or communication system 116.

A super-pulse laser driving scheme may be used. In a super-pulse driving scheme drive circuit 106 causes high energy bursts of energy to be supplied to semiconductor laser for short pulse lengths within a longer duty cycle. By operating semiconductor laser in such short bursts, semiconductor laser has less time to heat than semiconductor laser would have in the event that it is run in a continuous mode. Further, by separating such short bursts by larger duty cycles semiconductor laser is given time to cool to an extent. This reduces or eliminates the need for active cooling and the battery drain associated therewith while creating pulses of laser emission 134 that are high in intensity.

As is shown in FIG. 3, a patterned emission 134 from beacon system 70 in the present system may pass through an optical element 142 and into a distribution module 96 that where a reflector 160 reflects patterned emission 134 to create a patterned emission 134 such as to create a halo type emission 170 presenting reflected light within an more horizontal band useful for example to identify the location emitter module 90 to ground or sea based sensors. Other types of patterned emissions such as hemispheres, or cones or other shapes can be generated by beacon system 70 different attachable distribution modules 96 such as are described generally in commonly assigned U.S. Provisional Application 62/430,681 which is incorporated in full by reference. In embodiments, sensor 112*a* may sense conditions indicative of the presence of a particular distribution module 96 or the presence or absence of a distribution module 96 and provide a signal to control system 108 from which control system can determine a mode of operation. In other embodiments emitter module 90 may contain more than one laser module 104 to emit light in different directions in order to achieve desired patterns and intensities of light.

Figure 4:
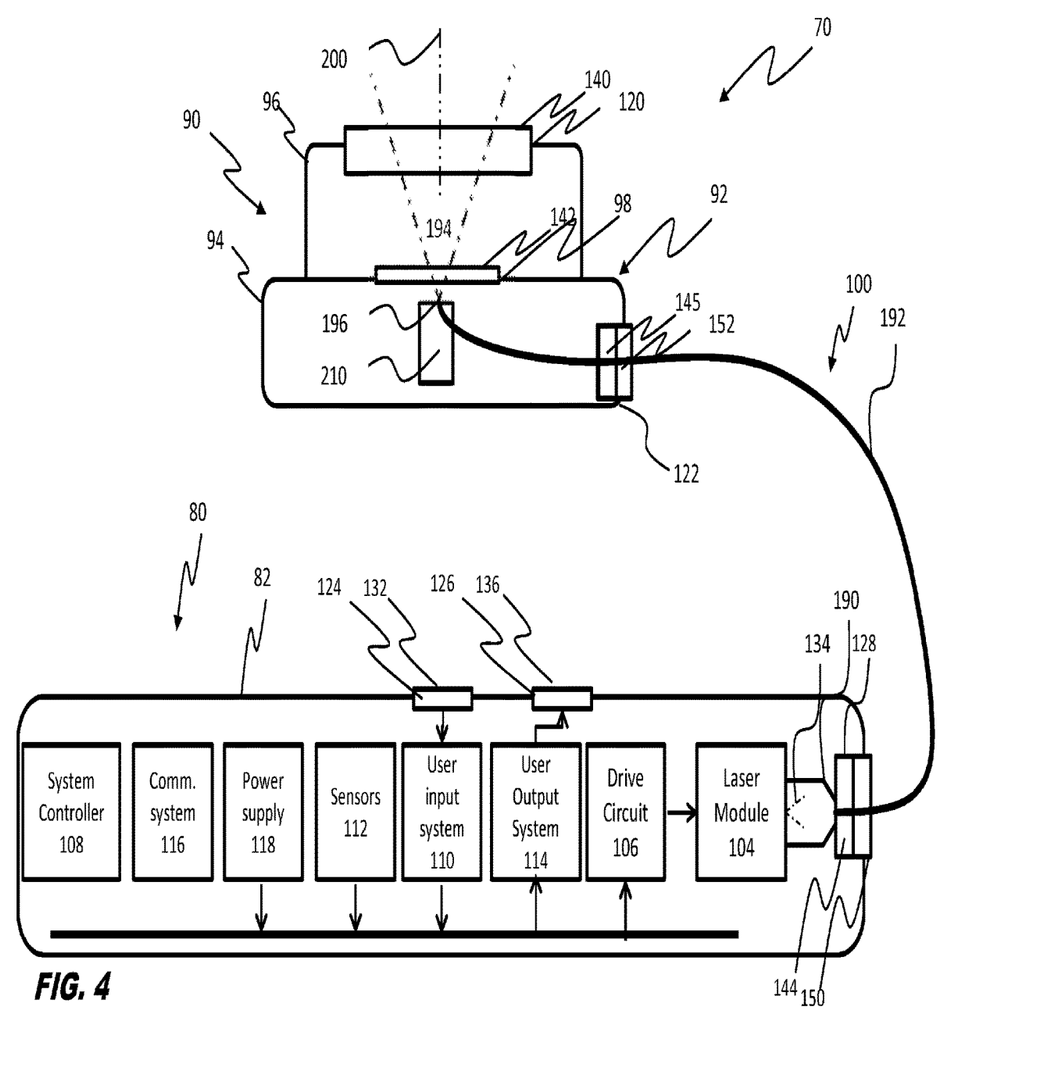
FIG. 4 is another embodiment of a beacon system.

In embodiments, drive circuit 106 may be positioned in control unit 80. Other embodiments are possible. For example, as is shown in FIG. 4, in still another embodiment emitter module 90 can be further reduced in weight and size by positioning drive circuit 106 and laser module 104 in control unit 80. In this embodiment, laser module 104 emits light 134 that in is, for example, infrared light in the mid-wave infrared wavelengths. Light 134 is captured by a fiber optic coupling 190 and fed into an optical pathway 192 provided by interconnect 100 to emerge as an emitted beam 194 from an exit aperture 196 of optical pathway 192 along a beam axis 200 that is generally perpendicular to exit aperture 194 and having a divergence determined by the characteristics of the optical pathway 192. In this embodiment a positioner 210 positions exit aperture 194 to align the emitted beam with beam axis 200. Positioner 210 can comprise any form of mechanical structure or article that can perform this alignment. Optical pathway 192 can, for example, comprise a fiberoptic or other form of waveguide or light pipe.

In other embodiments of this type, more than one optical pathway can be provided to capture light from one or more laser module 104 and positioner 210 can be used to direct each optical pathway 192 so that light emitted from each optical pathway 192 to create a desired emission pattern from emission module 90.

While the present invention has been particularly shown and described with references to preferred embodiments thereof, it will be understood by those skilled in the art that various changes in form and details may be made therein without departing from the spirit and scope of the invention as defined by the appended claims.

What is claimed is:

1. A beacon system, comprising:
an emitter unit including a base, a distribution module, and a laser module, the laser module being configured to emit a divergent beam of infrared radiation via an opening of the emitter unit; and
a housing removably attached to the emitter unit, the housing including a power supply configured to provide electrical energy to the laser module via an electrical connection between the power supply and the emitter unit,
the emitter unit further including a first optical element disposed proximate the opening, and a second optical element optically upstream of the first optical element and disposed proximate an opening of the base,
the laser module being configured to emit the beam via the first and second optical elements,
the beam having a first cross-sectional distribution pattern when the first and second optical elements are disposed within a path of the beam, and a second cross-sectional distribution pattern different from the first cross-sectional distribution pattern when only the second optical element is disposed within the path of the beam.

2. The beacon system of claim 1, wherein the distribution module is removably attached to the base, and the laser module is disposed within the base.

3. The beacon system of claim 1, wherein the electrical connection is formed, at least in part, by a first port disposed on the base and a second port disposed on the housing, the emitter unit further including a drive circuit configured to direct electrical energy, received via the first port, to the laser module.

4. The beacon system of claim 1, wherein the laser module comprises a mid-range infrared quantum cascade laser and a long-wave infrared quantum cascade laser.

5. The beacon system of claim 1, wherein the distribution module is removably attached to the base, the opening comprises an opening of the distribution module,
the first optical element is disposed at the opening of the distribution module, and the second optical element is disposed at the opening of the base.

6. The beacon system of claim 1, wherein the emitter unit further includes one or more sensors operably connected to a controller of the beacon system,
the one or more sensors being configured to:
determine at least one of an orientation or movement of the emitter unit, and
direct a first signal to the controller indicative of the at least one of the orientation or movement.

7. The beacon system of claim 6, wherein the one or more sensors are configured to determine the presence of a particular distribution module, and to direct a second signal to the controller indicative of the presence of the particular distribution module, the controller being configured to determine a mode of operation of the beacon system based at least in part on the second signal.

8. The beacon system of claim 1, further including an output system configured to generate one or more tactile signals indicative of a mode of operation of the beacon system.

9. The beacon system of claim 8, wherein the one or more tactile signals indicate that the beacon system is emitting the beam.

10. The beacon system of claim 8, wherein the one or more tactile signals are indicative of a characteristic of the beam.

11. The beacon system of claim 1, further including one or more sensors operably connected to a controller of the beacon system, the one or more sensors being configured to receive a user input, and to direct a signal indicative of the user input to the controller, wherein the controller is configured to determine a mode of operation of the beacon system based at least in part on the signal.

12. A beacon system, comprising:
a controller;
a power supply;
a laser module configured to emit a divergent beam of infrared radiation;
a first optical element;
a second optical element, the first optical element and the second optical element being configured to shape a cross-sectional distribution pattern of the beam; and
a drive circuit operably connected to the controller, the drive circuit being configured to direct, in response to a signal from the controller, electrical power from the power supply to the laser module, wherein:
the power supply is disposed within a first housing of the beacon system,
at least the laser module is disposed within a second housing of the beacon system removably attached to the first housing,
the laser module is configured to emit the beam from the second housing and via the first and second optical elements,
the beam having a first cross-sectional distribution pattern when the first and second optical elements are disposed within a path of the beam, and a second cross-sectional distribution pattern different from the first cross-sectional distribution pattern when only the second optical element is disposed within the path of the beam.

13. The beacon system of claim 12, further including a third housing removably attached to the second housing, the third housing including the second optical element and positioning the second optical element optically downstream of the first optical element.

14. The beacon system of claim 12, further including one or more sensors carried by the second hosing and operably connected to the controller, the one or more sensors being configured to determine at least one of an orientation or movement of the second housing, and to direct a first signal to the controller indicative of the at least one of the orientation or movement.

15. The beacon system of claim 14, the one or more sensors being configured to determine the presence of a particular third housing, and to direct a second signal to the controller indicative of the presence of the particular third housing.

16. The beacon system of claim 12, wherein the laser module comprises at least one quantum cascade laser, and the optical element comprises one of a lens or a window,
the beacon system further including an output system configured to generate a tactile signal indicating:
the beam is being emitted,
the quantum cascade laser is operating in a pulsed mode of operation, or
the quantum cascade laser is operating in a stand-by mode of operation.

17. A method of manufacturing a beacon system, comprising:
disposing a laser module within a housing of the beacon system, the laser module being configured to emit a divergent beam of infrared radiation from the housing;
coupling a first optical element to an opening of the housing optically downstream of the laser module;
coupling a second optical element to the beacon system optically upstream of the first optical element, the first and second optical elements being configured to shape a cross-sectional distribution pattern of the beam;
providing a controller;
providing a power supply separate from the housing; and
operably connecting a drive circuit to the laser module and the controller,
the drive circuit being configured to direct, in response to a signal from the controller, electrical power, received from the power supply via a port of the housing, to the laser module, and
the beam having a first cross-sectional distribution pattern when the first and second optical elements are disposed within a path of the beam, and a second cross-sectional distribution pattern different from the first cross-sectional distribution pattern when only the second optical element is disposed within the path of the beam.

18. The method of claim 17, further comprising:
operably connecting a first sensor to the controller, the first sensor being configured to determine at least one of an orientation or movement of the housing, and to direct a corresponding first signal to the controller; and
operably connecting a second sensor to the controller, the second sensor being configured to receive a user input, and to direct a corresponding second signal to the controller.

19. The method of claim 17, wherein the housing comprises a first housing, the method further including disposing at least the power supply and the controller within a second housing of the beacon system removably attachable to the first housing.

20. A beacon system, comprising:
an emitter unit including a base, a distribution module, a laser module, and one or more sensors operably connected to a controller of the beacon system, the laser module being configured to emit a divergent beam of infrared radiation via an opening of the emitter unit; and
a housing removably attached to the emitter unit, the housing including a power supply configured to provide electrical energy to the laser module via an electrical connection between the power supply and the emitter unit, the one or more sensors being configured to:
determine the presence of a particular distribution module, and
direct a signal to the controller indicative of the presence of the particular distribution module, the controller being configured to determine a mode of operation of the beacon system based at least in part on the signal.

21. The beacon system of claim 20, the one or more sensors being further configured to:
determine at least one of an orientation or movement of the emitter unit, and
direct a second signal to the controller indicative of the at least one of the orientation or movement.

* * * * *